(12) United States Patent
Henning et al.

(10) Patent No.: US 6,986,365 B2
(45) Date of Patent: Jan. 17, 2006

(54) HIGH-FLOW MICROVALVE

(75) Inventors: Albert K. Henning, Palo Alto, CA (US); Michael Selser, Livermore, CA (US); Bradford A. Cozad, Newark, CA (US)

(73) Assignee: Redwood Microsystems, Menlo Park, CA (US)

( * ) Notice: Subject to any disclaimer, the term of this patent is extended or adjusted under 35 U.S.C. 154(b) by 170 days.

(21) Appl. No.: 10/676,469

(22) Filed: Sep. 30, 2003

(65) Prior Publication Data

US 2005/0067029 A1    Mar. 31, 2005

(51) Int. Cl.
*F16K 1/42*    (2006.01)
(52) U.S. Cl. .............................. 137/625.28; 137/625.3
(58) Field of Classification Search ........... 137/625.28, 137/625.3, 625.33; 251/319
See application file for complete search history.

(56) References Cited

U.S. PATENT DOCUMENTS

| | | | |
|---|---|---|---|
| 3,729,025 A * | 4/1973 | Silvestrini | 137/625.33 |
| 3,792,720 A * | 2/1974 | Robbins | 137/625.28 |
| 4,538,642 A | 9/1985 | Shutten et al. | |
| 4,585,209 A | 4/1986 | Aine et al. | |
| 4,966,646 A | 10/1990 | Zdeblick | |
| 5,251,871 A * | 10/1993 | Suzuki | 251/127 |
| 5,333,831 A | 8/1994 | Barth et al. | |
| 5,780,748 A * | 7/1998 | Barth | 73/861.47 |
| 6,129,331 A | 10/2000 | Henning et al. | |
| 6,412,751 B1 * | 7/2002 | Wang | 251/61.1 |

FOREIGN PATENT DOCUMENTS

EP    0 836 012    7/2003

OTHER PUBLICATIONS

T. K. Wang et al.; "Production-ready silicon micro valves" Micromachined Devices and Components V, P. J. French and E. Peeters (eds.), pp. 227-237 vol. 3876, SPIE, Bellingham, WA, 1999.
W. Van Der Wijngaart, "A study of orifice-controlled flow for microvalve design optimization". Designing Microfluidic control components, Ph.D dissertation, Paper #8, Royal Institute of Terminology, Sweden 2002.
A.K. Henning, "Improved Gas Flow Model for Microvalves." In Proceedings, Transducers '03:2003 Int'l Solid State Sensors and Actuators Conference, pp. 1550-1553 (IEEE Press, Piscataway, NJ, 2003).

* cited by examiner

*Primary Examiner*—John Fox
(74) *Attorney, Agent, or Firm*—Fernandez & Associate LLP

(57) ABSTRACT

A method for achieving high flow in valves with small actuation distance is described. A detailed description for a silicon microvalve is provided. An algorithm is described for designing optimized valves.

2 Claims, 9 Drawing Sheets

HIGH-FLOW MICROVALVE

FIELD OF INVENTION

The invention relates to the field of micromachined microvalves and more particularly to a microvalve for controlling high flows of fluids.

BACKGROUND OF INVENTION

The notion of a 'microvalve' rejects, on the surface, its use for high-flow applications in industrial process fluid distribution and control. Mass flow controllers (MFCs) in semiconductor processing require gas flows up to 50 standard liters per minute (slm). And, gas or liquid chromatography instruments can require similar sorts of flows. Refrigerators require liquid flows up to 12 cubic centimeters per minute (ccm), equivalent to perhaps 12 slm of gas flow. Manifold air flow applications in automobile engines also require high air flow to optimize vehicle motor efficiency and power. Requirements for control of high-purity fluids, proportional flow control, and for fast response, raise additional barriers to the use of microvalves in such high-flow applications.

U.S. Pat. No. 4,538,642 [1] and U.S. Pat. No. 4,585,209 [2] disclose an array of apertures in the inlet and/or the valve seat of a small valve. Electrostatic actuation of a diaphragm or cantilever against the array turns flow on and off. It is clear from the design that an array of apertures in the valve seat is used to provide mechanical support for the diaphragm or cantilever and to facilitate the electrostatic force for opening and closing. Neither (642) nor (209) discusses the benefits of flow through multiple apertures.

U.S. Pat. No. 5,333,831 [3] discusses raising the edges of the valve seat in a microvalve, in order to reduce the resistance to flow through a microvalve. This invention teaches the use of a microvalve with a single inlet and outlet.

Zdeblick [4] teaches the essential behavior and technology of a microvalve which uses thermopneumatic actuation. U.S. Pat. No. 4,966,646 is incorporated herein by reference.

Richter [5] describes a microvalve having a valve flap which actuates against a plurality of valve openings constituting valve seats. The structures disclosed include many different outlet port channel designs and opening designs; one design includes the teachings of [3], with respect to raising valve seat edges to minimize the flow resistance through the structure. The flow is described qualitatively as proportional to the plurality of valve openings and the distance to the valve flap. The Richter invention is a two-positioned valve, open or closed; there is no proportional control. And, as with previous inventions except Zdeblick's, the flow direction is vertical or transverse, passing through a "rigid" diaphragm and exiting through the plane of the valve seat.

Wang [6] describes an "order of magnitude" microvalve flow model, wherein the flow is linearly proportional to the gap between the rigid boss on a diaphragm, and the valve seat. As such, the model does not account for flows when the gap is relatively large compared to the diameter of the valve seat of the orifice. The effective area for flow is given quantitatively as the product of the sum of the four orifice sides and the gap distance. Wang appears to be attempting to use a simplified version of the ideal sonic flow equation for compressible gases.

U.S. Pat. No. 6,129,331 [7] reports a microvalve with a deformable membrane against a raised valve seat. 'Deformable' in this sense means the membrane is not necessarily flat, but can have a curvature defined by the thickness of the membrane, and the edge structure of the frame which supports the membrane. This reference also describes a microvalve which is surface mounted. That is, unlike the microvalve references above, the flow enters and exits the microvalve through a single plane, which is also the plane of attachment between the microvalve and its supporting package or manifold. Such a surface mounting scheme limits the materials wetted by the controlled fluid to the valve material, the attachment material and the manifold material. U.S. Pat. No. 6,129,331 is incorporated herein by reference.

van der Wijngaart [8] reports finite element simulation of microvalve flow. Various valve seat topologies are studied. Each is configured as an array of square orifices, some with raised edges. A complex diaphragm, with inlet holes to allow flow through the diaphragm, is raised and lowered uniformly toward or away from the valve seat array. That is, the diaphragm is not deformable. An alternate design has the flow entering from the side and raised bosses on the diaphragm act to seal against the valve seat. van der Wijngaart recognizes that as the diaphragm or boss approaches the valve seat, the flow, through the orifice in the valve seat, becomes a function of the area defined by the boss perimeter and the gap, z. When the boss is more than r/2 away from an orifice of radius r, the orifice area becomes the critical parameter in determining flow. van der Wijngaart focuses on short stroke valves, much less than 50 $\mu$m. He is trying to solve the problem of achieving flows greater than can be supported by an orifice whose radius is one-half the stroke length. van der Wijngaart's solution is to make multiple orifices of the maximum allowed diameter while staying just inside the "valve seat" control region or r/2. Nowhere does he mention the importance of the orifice periphery.

All microvalves in the prior art are limited in flow to 5 slm or less. There is a need for a microvalve which can achieve higher flows.

SUMMARY OF INVENTION

Flow through a microvalve cannot be optimized without simultaneous consideration of the microvalve response time, since the response time is largely a linear function of the membrane-to-seat gap which must be traversed. The flow model which accounts for the effects of microvalve seat periphery helps illuminate unanticipated and non-obvious solutions to the simultaneous problem of delivering high flow and rapid response.

In addition, high-flow MFCs, which demand large dynamic range and high flow resolution, require unattainably large resolution of the diaphragm position relative to the valve seat array, if the diaphragm is flat, and not deformable. Only if the actuated surface is deformable, as in a membrane, can the requirements for high absolute flow, wide dynamic range, and high flow resolution, be met at once. As described and used herein, the term 'diaphragm' will be used for non-deformable plates which move up and down in a plane to restrict or allow flow through an opening in the valve seat. The term 'membrane' will be used for structures having a deformable portion which takes on an elliptical or toroidal type shape as it is actuated toward the valve seat. Upon first contact the membrane starts to flatten out, progressively covering more and more of the valve seat openings as it achieves full actuation and full closure.

For instance, consider a pressure-based MFC designed to flow 5 slm, or 5000 sccm, of nitrogen gas, where the critical orifice in the flow sensor delivers a flow of 5 slm at 15 psia. The MFC is required to resolve flow to within 1% of setpoint, for a 50:1 dynamic range of setpoints. That is, if the setpoint is 2% of full scale, or 100 sccm is flowing, the MFC must resolve 1% of this value, or 1 sccm. Contrast the requirement when a rigid diaphragm is used versus a deformable membrane. Using the flow model of Reference [10], a valve seat array consisting of 23 holes, each with a diameter of 500 μm, will deliver 5000 sccm of flow with an inlet pressure of 15 psia, a temperature of 298 K, and a gap between the valve seat array and the membrane of 15 μm. To resolve flow to within 1% of setpoint for 100% of full scale flow (that is, to resolve 50 sccm when the flow setpoint is 5000 sccm), a deformable membrane position must be resolved to within 15 nm, which is an achievable number. However, to resolve flow to within 1% of setpoint for 2% of full scale flow (that is, to resolve 1 sccm when the flow setpoint is 100 sccm), the rigid diaphragm position must be resolved to within 0.3 nm, which is not an achievable number. In the instance of this most stringent requirement, only a membrane which is deformable can achieve the required resolution. That is, only a membrane whose gap with respect to the valve seat array is not a uniform value, especially near valve closure, can achieve the required resolution. By closing down the openings gradually across the entire array the difficulty of achieving high resolution is solved.

Most MFCs operate with valve inlet pressures considerably higher than 15 psia, placing even greater restrictions on the diaphragm position resolution requirements, and making a deformable membrane even more imperative.

Previous authors [3,6,9] do not discuss the crucial effect of the width of the valve seat around the length of the seat periphery. If this width is too large, then parasitic resistance effects come into play. These effects cause two observable phenomena in microvalve flow, which limit microvalve performance: first, a weak or suppressed 'turn-on' characteristic, sometimes referred to as 'soft turn-on'; second, a reduced maximum value of flow for a given set of pressure and temperature boundary conditions. The work herein specifically reports the essential aspect of this seat width, and that it must be minimized.

Thus, the invention here is not obvious, but will nonetheless be appreciated by one skilled in the art. Specifically, a high-flow, proportional microvalve is disclosed, wherein high flow is achieved using a valve seat structure with a large ratio of valve seat periphery to cross-sectional flow area. Simultaneously, high speed response is retained by minimizing the gap which the membrane must traverse to achieve the highest and lowest flow states of the microvalve. Furthermore, excellent proportional control, high flow resolution and wide dynamic range are achieved, by actuating a deformable membrane with respect to the valve seat structure. Furthermore, high-purity fluids are accommodated, by using a membrane instead of a cantilever, and by using a membrane which is without perforations, but instead directs the flow from (or toward) the valve seat structure to (or away from) a flow outlet (or inlet) structure, which is on the same plane as the valve seat structure.

It is worth noting that the discussions here describe impingement flow in a valve. It will be apparent to those skilled in the art that the discussions could as easily describe suction flow in a valve, with no loss of effect or generality.

Figure 1:
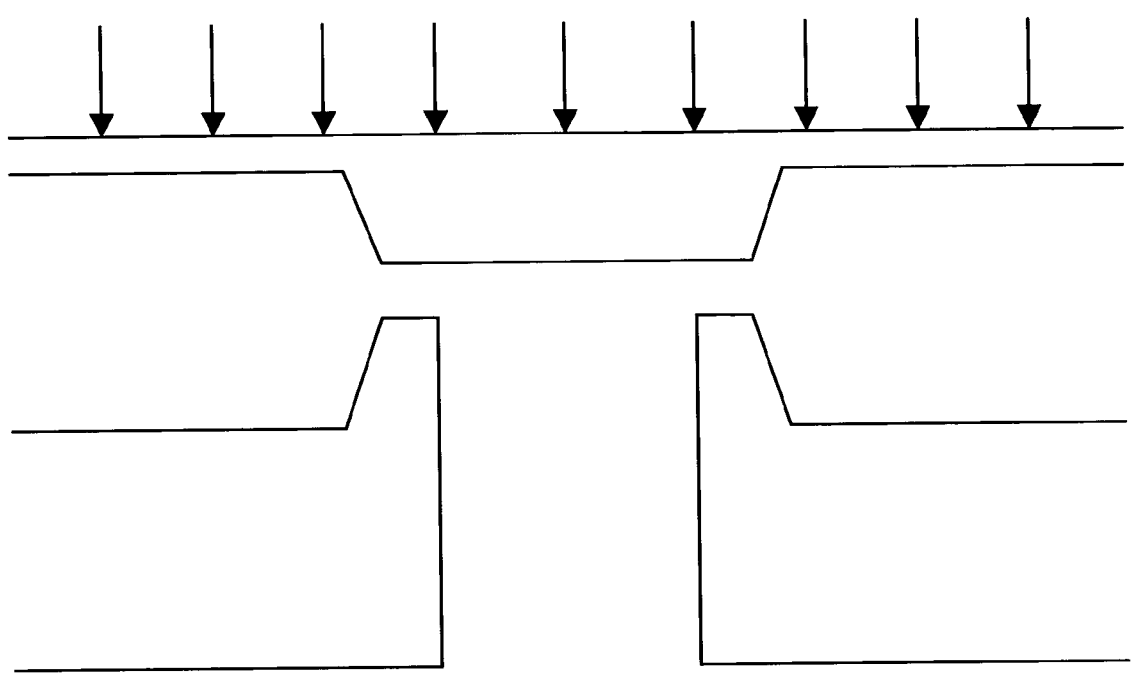
FIG. 1 is a cross-sectional view of a state-of-the-art microvalve. A membrane is actuated toward or away from a valve seat, in order to close or open the valve, thereby reducing or increasing the flow through the valve. The arrows indicate the actuation force on the membrane. The membrane may or may not include a boss. The presence of a boss typically is used to retain a flat aspect between the actuated membrane and the valve seat, in order to minimize valve leakage.
Figure 2:
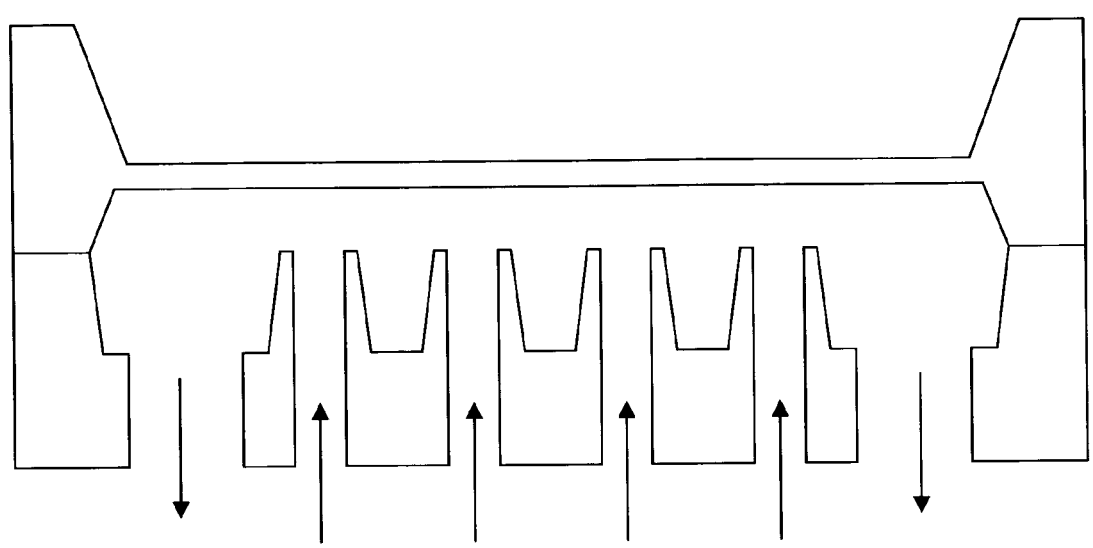
FIG. 2 is a cross-sectional view of the microvalve of this invention. The valve seat is either an array of individual orifices, or a single orifice with a complex, convoluted periphery structure. The valve seat edges may or may not be raised with respect to the substrate which supports the valve seat structure, in order to reduce the parasitic flow resistance. The arrows indicate the inlet flow and the outlet flow.

| List of Variables | |
| --- | --- |
| $\dot{m}$ | Mass flow (kg/sec) |
| $P_{in}$ | Inlet pressure |
| $P_{out}$ | Outlet pressure |
| V | Flow velocity |
| ρ | Gas density |
| γ | Ratio of specific heats, $c_p/c_v$ |

-continued

List of Variables $\alpha$ $= \sqrt{\gamma\left(\frac{2}{1+\gamma}\right)^{\frac{\gamma+1}{\gamma-1}}}$ $\delta$ $= \sqrt{\frac{2\gamma}{(\gamma-1)}}$ R     Gas constant in p = ρRT (8314 m²/K-sec² divided by molecular weight)
W    Microvalve valve seat periphery length
A     Microvalve area enclosed by the valve seat periphery
$D_h$   Microvalve inlet length parameter $(= \sqrt{A})$
$A_{eff}$   Microvalve effective flow area
z     Microvalve membrane-to-inlet gap
r     Ratio of gap to inlet length parameter: $r = z/D_h$
$r_0$   The ratio of gap to inlet length parameter which defines the boundary between seat-controlled flow and transition flow, according to Reference [9]
$\phi$    Ratio of valve seat periphery length to inlet length parameter: $\phi = W/D_h$
$C_d$   Microvalve inlet coefficient of discharge
$C_v$   Microvalve coefficient of flow

DETAILED DESCRIPTION OF PREFERRED EMBODIMENT

This invention discloses a method of designing valves which achieve high flow by maximizing the ratio of valve seat periphery length to a linear parameter equal to the square root of the area enclosed by the valve seat periphery. A preferred structure for a given valve seat area is also disclosed. This flow maximization also minimizes the gap between the actuator and the valve seat, corresponding to a desired maximum flow. As such, these valve designs presume valve operation in the gap height controlled regime, where the gap is less than one-half the radius of the combined valve seat opening. However, as the valve flow model indicates, this classical situation does not always hold. Orifice-controlled flow must also be considered. The transition from gap-controlled to orifice-controlled flow is a function of the actual design parameters of the valve, making the full flow model, given below, essential.

By maximizing the flow for a given constraint on the valve seat area, the flow for a given set of pressure boundary conditions across the valve is also maximized.

The classical compressible gas flow equations which are used to design valves according to this invention are as follows. The coefficient of discharge accounts for boundary layer effects as gas moves through the most constrictive portion of the microvalve. The coefficient of flow accounts for other departures from the classical theory as gas moves through the remaining portions of the microvalve.

$$\dot{m}_{sonic} = C_d C_v A_{eff} \alpha(\gamma) \frac{P_{in}}{\sqrt{RT}}$$

$$\dot{m}_{subsonic} = C_d C_v A_{eff} \delta(\gamma) \frac{P_{in}}{\sqrt{RT}} \left(\frac{P_{out}}{P_{in}}\right)^{\frac{\gamma+1}{2\gamma}} \sqrt{\left(\frac{P_{in}}{P_{out}}\right)^{\frac{\gamma-1}{\gamma}} - 1}$$

In order to describe microvalve flow, the classical equations are modified as follows.

$$A_{eff} = Wz = WD_h r \quad \text{for } \left(0 < \frac{z}{D_h} < r_0\right)$$

$$A_{eff} = WD_h r_0 + (A - WD_h r_0)\left[1 - \exp\left(-\frac{r - r_0}{\eta}\right)\right] \quad \text{for } \left(r_0 < \frac{z}{D_h}\right)$$

$$A_{eff} = A \quad \text{for } \left(\frac{z}{D_h} \gg 1\right)$$

These equations address, first, the relation between flow, and valve inlet and outlet pressures; and second, the relation between the effective flow area for the valve, and the values of membrane-to-seat gap, and valve seat periphery length. A full explanation is found in Reference [9], incorporated herein by reference. (Equations for liquid flow can also be described. They have a different relationship between flow and valve inlet and outlet pressures, but retain the above relationship regarding effective area.)

As an example, an array of 10 circular valve seats, each with diameter 500 μm, would have a periphery length W of π*500*10 μm, an area A of 10*π*(500)²/4, and an inlet length parameter $D_h = \sqrt{A} = 1400$ μm. The ratio $\phi$ is 11.2.

The parameter $r_0$ is an empirical fit parameter in the context of the model. For microvalves with valve seat diameters between 0.085 mm and 2.0 mm, experimental evidence shows that $0.13 < r_0 < 0.17$. Note that, because of continuity of the effective area functions and their first derivatives, this is the only free parameter in the model. $r_0$ is determined by adjusting the theoretical results to the actual results for a given valve and manifold design.

The equations enable various sorts of design optimization. For instance, given a specification for pressure and flow boundary conditions, using the model a function can be generated which relates membrane-to-seat gap as the independent variable, to valve seat periphery length as the dependent variable. The choice of gap can be made based on requirements for speed or power consumption in the valve actuator. The resulting periphery length can then be executed as a valve seat design using only a single orifice, with a convoluted periphery, or as an array of identical orifices, which may be square, circular, or of arbitrary shape.

Alternatively, a given valve seat structure defined by periphery length and maximum membrane-to-seat excursion leads to generation of a function which relates valve inlet and outlet pressure to flow.

It is worth noting that, while the invention relates ostensibly to microvalves, it can in fact be generalized to valve structures of any size. As such, the applications go beyond those usually associated with microvalves, to include industrial applications, such as the control of natural gas in stove or burner or steam flows.

Figure 8:
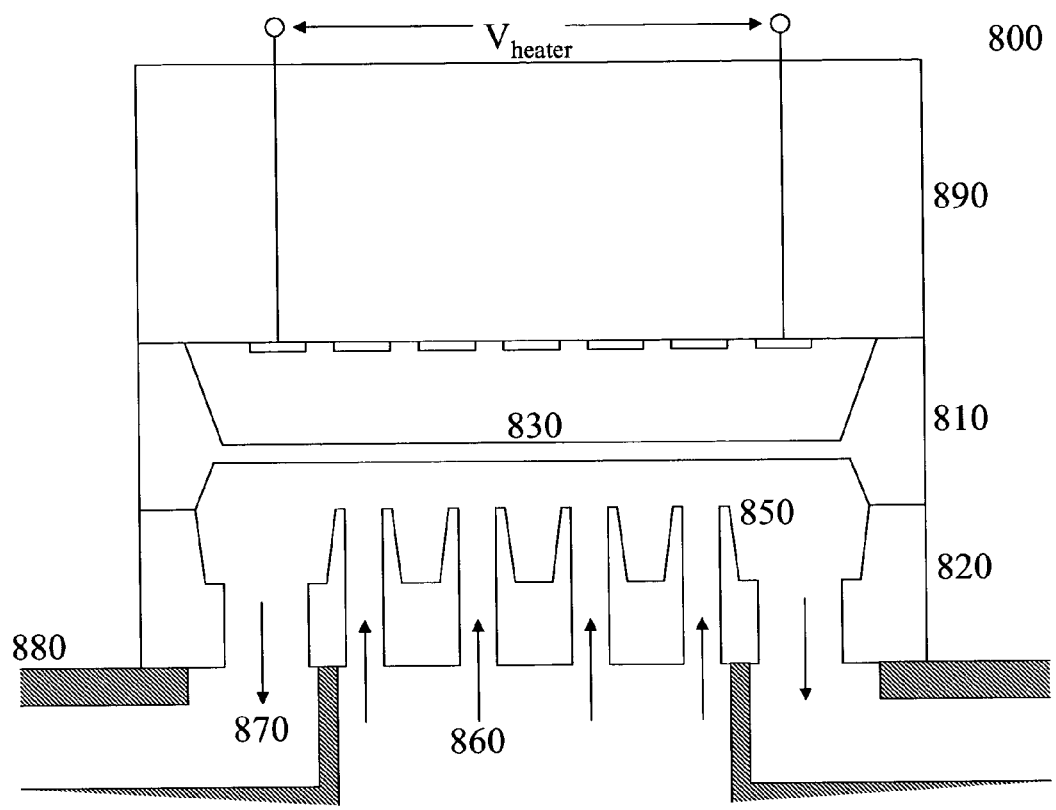
FIG. 8 is a cross-sectional view of the preferred embodiment of the present invention, including the actuator associated with the microvalve membrane.

The preferred embodiment of the disclosed microvalve is the valve structure 800 shown in FIG. 8. The valve is attached to a manifold 880. The valve is comprised of a glass layer 890, a silicon membrane 830 with support structure 810, and a silicon valve seat structure 850. The valve seat structure 850 is comprised of an array of circular orifices, fabricated out of silicon using micromachining techniques. The inlet flow 860 and outlet flow 870 are also depicted. The diameter of each orifice is approximately 450 μm, but can vary between 50 μm and 1.5 mm. Lower flows could be controlled with smaller diameter orifices and smaller valves. Larger diameters can be accommodated using membrane areas larger than those described in the preferred embodiment. Such additional ranges are deemed part of this invention; one familiar with the art will understand how to scale the present dimensions up or down. The center-to-center spacing of the orifices in the array is approximately 625 $\mu$m. The width of the periphery of the seat of each orifice is approximately 50 $\mu$m. The number of orifices in the valve seat array is as small as 2, and as large as 25, consistent with the deformation characteristics of the preferred actuator membrane. However, for smaller orifice diameters, the number of orifices in the array can grow significantly, and still fit within this membrane. As with larger diameter orifices, larger numbers of orifices in the array can be accommodated by increasing the area of the actuator membrane.

In order to minimize parasitic flow resistance, the individual orifices have a seat surface which is approximately 100 $\mu$m above the plane of the structure which supports the valve seat array. This height can be more or less than 100 $\mu$m. Indeed, an entirely flat plate can be utilized, in order to achieve higher resolution, at the expense of parasitic flow resistance which would limit the maximum value of flow through the structure for a given design.

The support structure for the valve seat array also contains the exit holes for the flow. If the orifice array is changed from an entrance to exit aspect, then these exit holes become entrance holes. These are situated either as a slot along an edge of the support structure, or as one or more holes located symmetrically with respect to the array. The flow model still applies even under conditions of reverse flow.

The membrane which is actuated against the valve seat array in the current embodiment is also preferably micromachined from silicon. It is a flat flexible plate, approximately 4 mm square, and approximately 50 $\mu$m thick. The membrane contains no perforations, as its use in the microvalve facilitates a 'surface-mount' microvalve, wherein the flow enters and exits the valve seat array and its support structure through the same plane. The absence of perforations also makes the microvalve appropriate for use with fluids that demand contact with a minimum of different materials, and contact with a limited set of materials. In particular, MFCs for the control and distribution of high-purity fluids used in the manufacture of semiconductor devices have such a stringent requirement. The membrane also contains no complex structures, as in [6] for contacting the valve seat array, as these structures would add thickness fluctuations, which would defeat the deformable nature of the membrane, which is the preferred embodiment of this invention.

The maximum gap between the membrane and the valve seat array, along with the valve seat periphery length, the fluid type, the temperature, and the pressure boundary conditions, determine the rate of mass flow through the microvalve. In the preferred embodiment, the value of the gap ranges between 5 and 50 $\mu$m for high flow microvalves. Smaller gaps can be achieved for quite small flows. Larger gap values can be also accommodated at the expense of more costly actuation schemes or other performance tradeoffs.

The membrane can be actuated via any means consistent with an absence of perforations through it. Pneumatic and thermopneumatic actuation are suited most ideally for this structure, as they supply isobaric force to the actuator side of the membrane. Other actuation methods, such as piezoelectric, shape-memory alloy, or bimetallic, are options as well.

Figure 3:
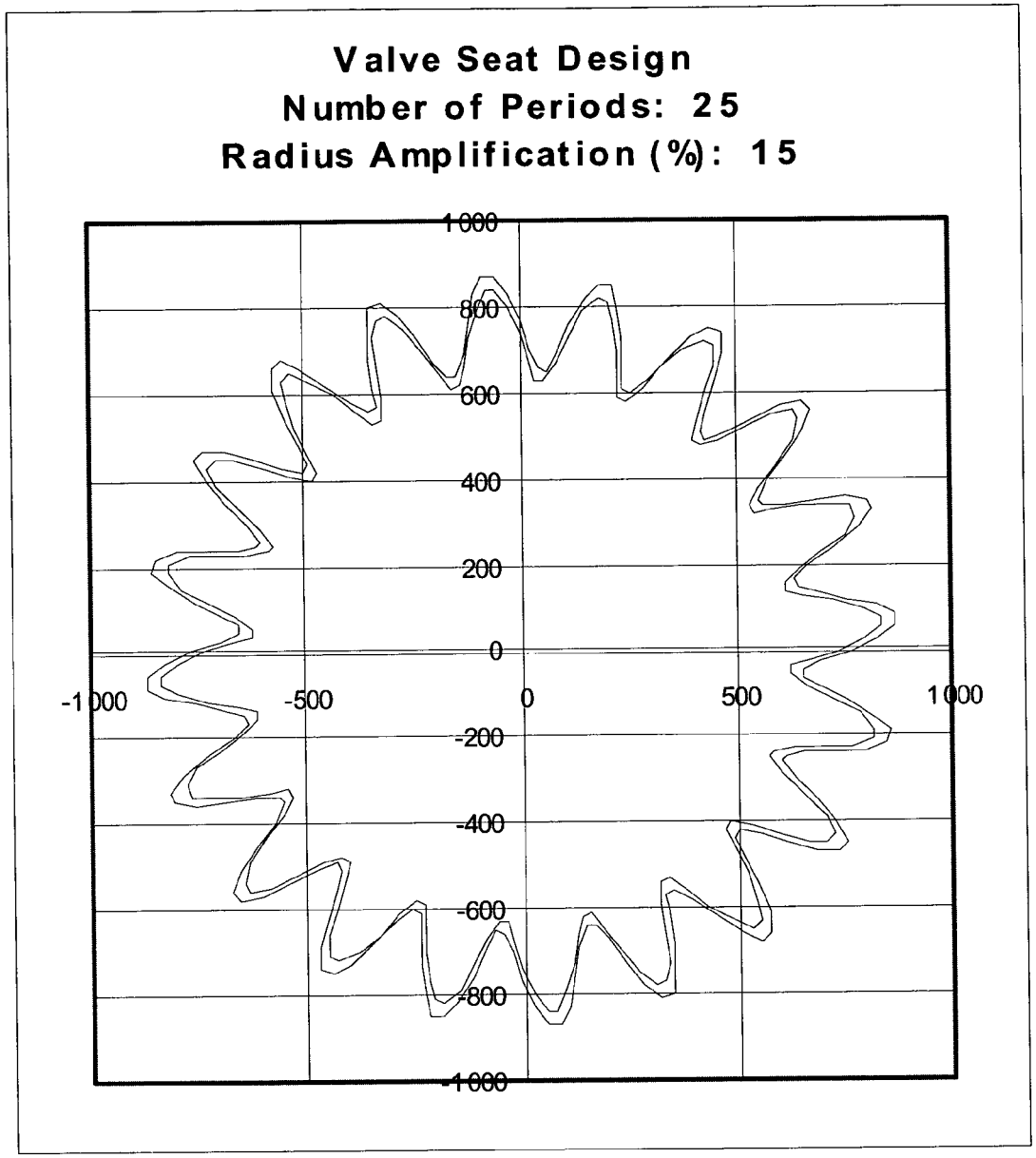
FIG. 3 is a plan view of a single-orifice valve seat with a sinusoidally-varying radius function applied to an otherwise-circular edge structure, leading to a large periphery-to-area ratio, and consequently high flow at small membrane-to-seat gaps. The numbers shown are dimension in micrometers.
Figure 4:
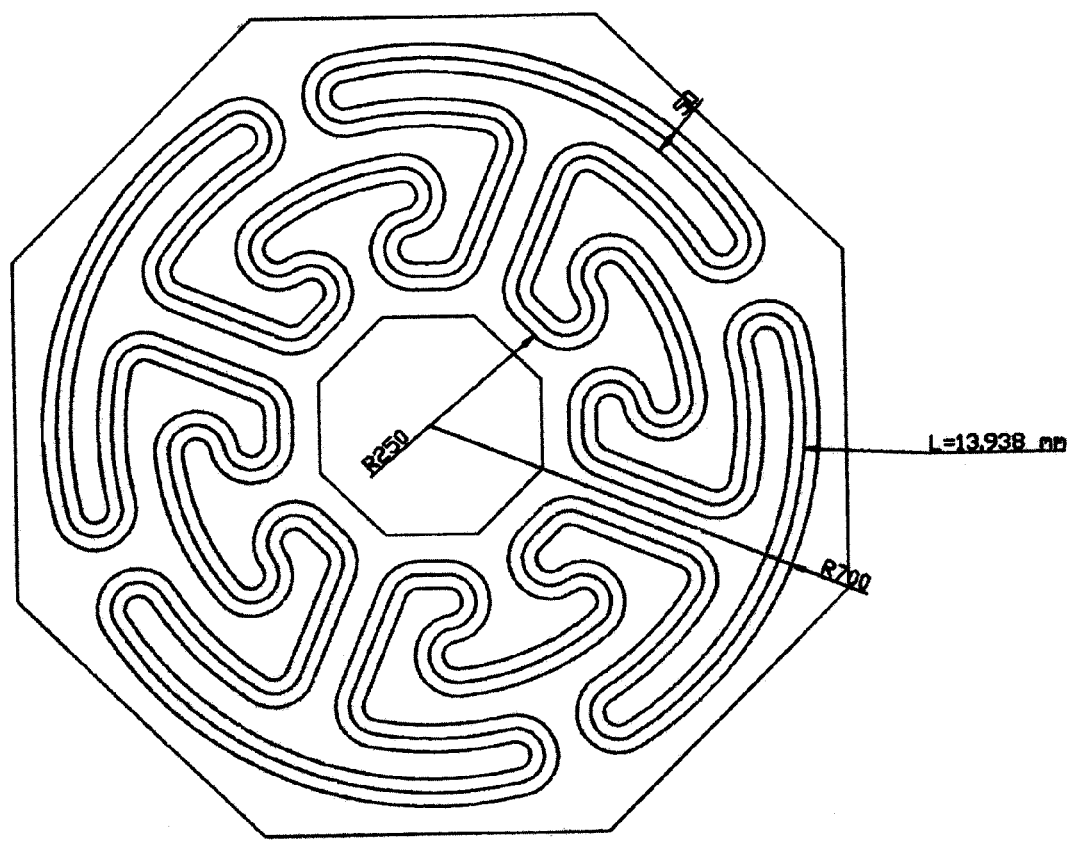
FIG. 4 is a plan view of a single-orifice valve seat with a convoluted edge structure, leading to a large periphery-to-area ratio, and consequently high flow at small membrane-to-seat gaps. The numbers shown are dimensions in micrometers, except for the value of L, which is in millimeters.
Figure 5:
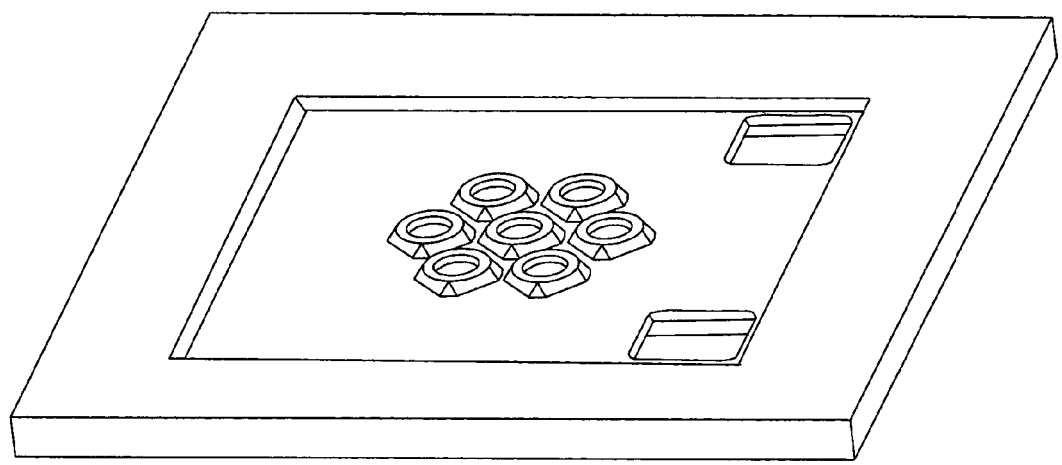
FIG. 5 is a plan view of a valve seat structure comprised of an array of circular orifices, leading to a large periphery-to-area ratio, and consequently high flow at small membrane-to-seat gaps.
Figure 6:
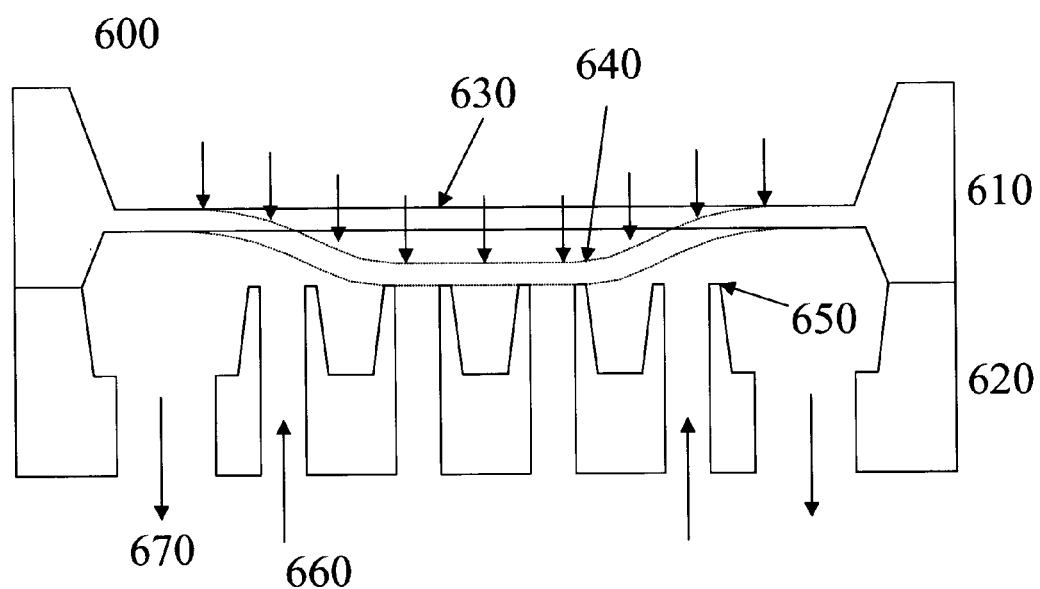
FIG. 6 is a cross-sectional schematic view of a microvalve 600. The essential elements include a membrane 630 moving deformably 640 against a valve seat structure 650 containing an array of orifices. The membrane is supported by a frame 610, and the valve seat structure is supported by a frame 620. The inlet flow 660 moves through the valve seat structure 650 before exiting as outlet flow 670. The non-uniform nature of the membrane deformation gives rise to an increasing gap between the membrane and the valve seat structure as one moves from the center to the edge.
Figure 7:
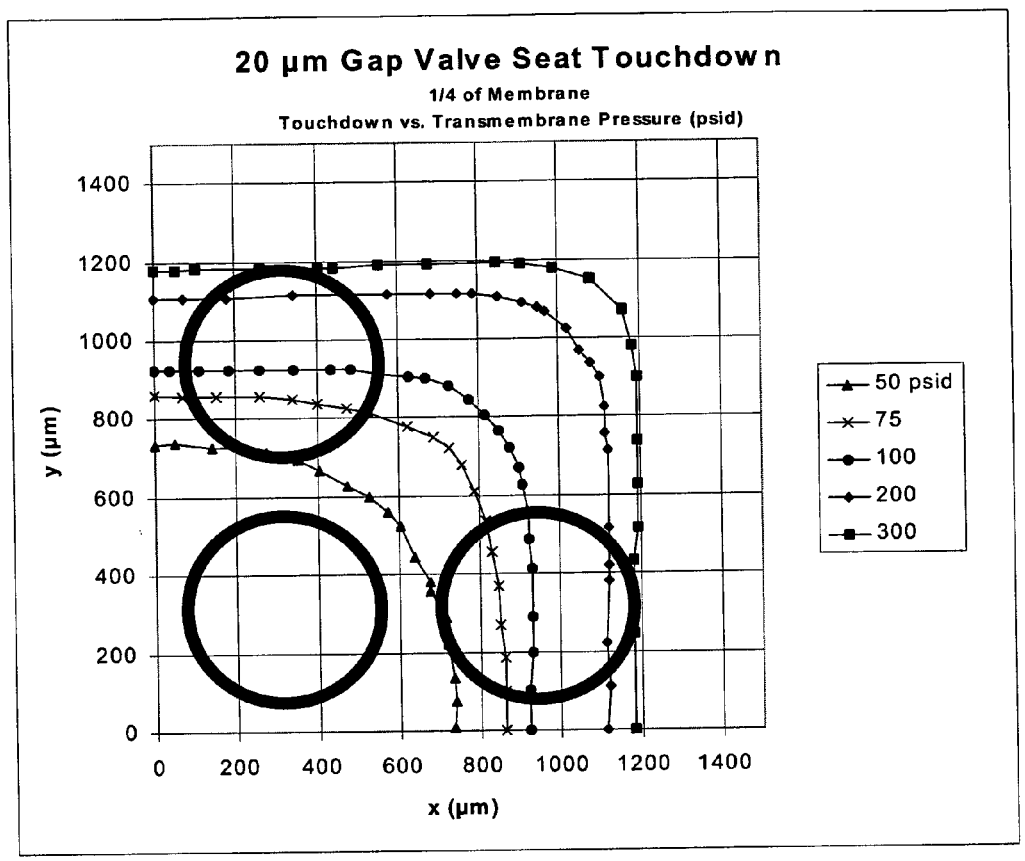
FIG. 7 is a plan view of a simulation of contact between a square, thin deformable membrane, and a flat surface which represents a valve seat structure containing an array of 12 orifices. Due to symmetry considerations, only one quarter of the membrane and valve seat structure are shown. The indicated contours define the contact area between the membrane and the valve seat structure, at the given values of transmembrane pressure.

Alternatively, orifice configurations with sinusoidal or convoluted periphery can be employed, as shown in FIG. 3 and FIG. 4. The convoluted structure results in increased periphery within a given overall area (to be covered by the membrane) more efficiently. The convoluted valve seat structure has a higher periphery-to-area ratio than the sinusoidal valve seat structure.

Figure 9:
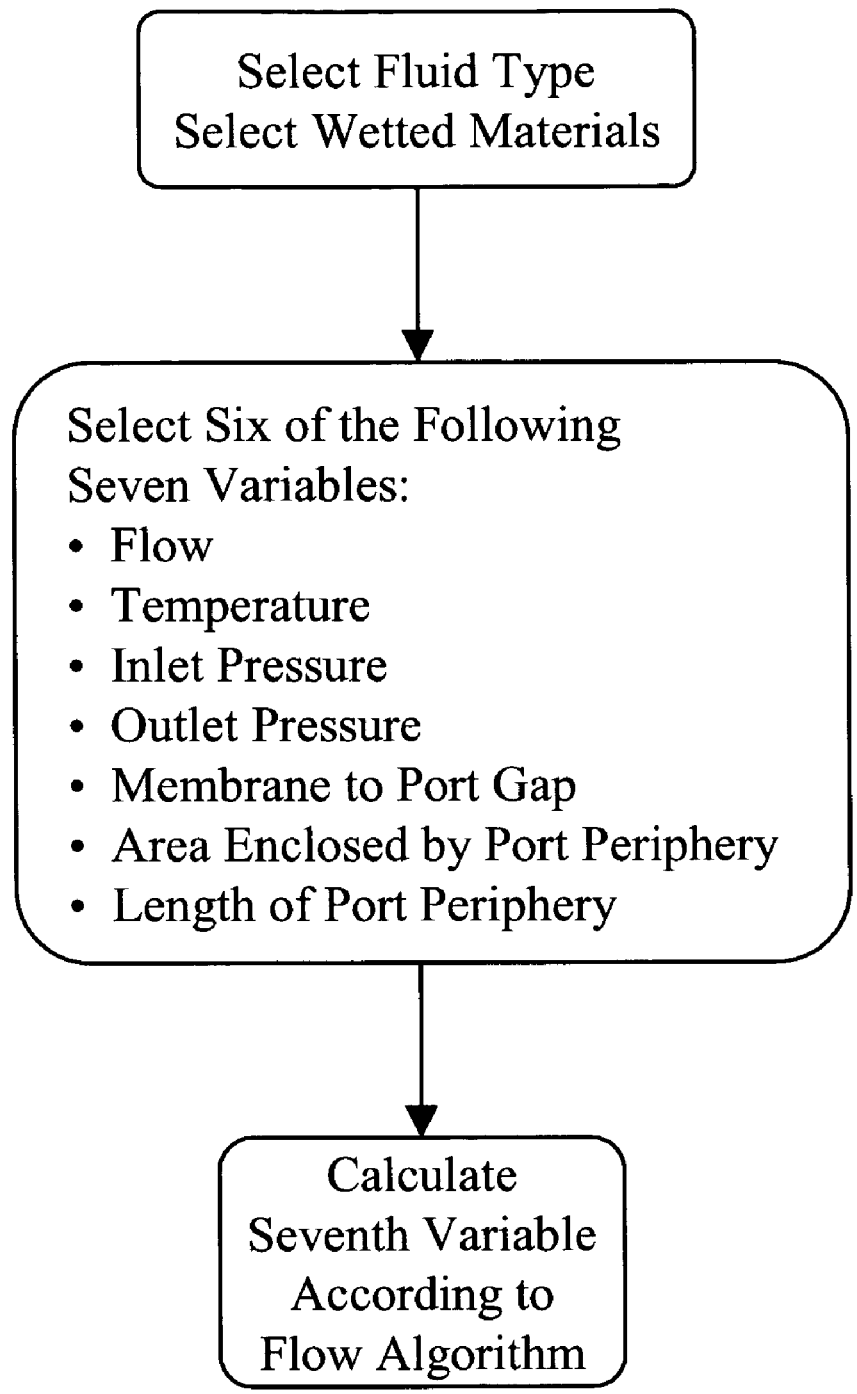
FIG. 9 is a flow chart of a microvalve design method, which relates microvalve flow to structural parameters, gas parameters, and boundary conditions such as temperature and pressure, according to the high flow algorithm described subsequently.

The methods of designing microvalves are closely related to the high flow algorithm described in Reference [10]. These methods are depicted in FIGS. 9 and 10. The most salient aspect of the methods is that one of two approaches can be chosen. In the first method, the fluid is chosen, along with the temperature and pressure boundary conditions. Then, the algorithm of Reference [10] allows the flow to be determined as a function of the effective area, where the effective area is itself a function of the valve inlet port size (area and periphery length), and the number of ports in the valve inlet array. In the second method, the fluid is again chosen, along with the temperature. The effective area is held fixed, as determined from the structural details (area, periphery length, and number) of the inlet ports. Then, the algorithm of Reference [10] allows the flow to be determined as a function of inlet and outlet pressures.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. Other variations and embodiments are possible in light of the above teachings, and it is thus intended that the scope of invention not be limited by this Detailed Description, but rather by the Claims following.

What we claim:

1. A valve, comprising:
    a fluid channel plate with a top surface and a bottom surface with two or more inlet ports and one or more outlet ports connecting the surfaces;
    a membrane plate with a top surface and a bottom surface wherein the bottom surface is attached to the top surface of the fluid channel plate, whereby the membrane plate including a displaceable membrane portion can selectively obstruct one or more of said inlet ports of said fluid channel plate; and
    means for proportionately actuating the displaceable membrane portion attached to the top surface of the membrane plate;
    wherein the ratio of the sum of the periphery of the inlet ports to the square root of the sum of the areas of the inlet ports is greater than four.

2. A method for maximizing the flow while minimizing the inlet pressure of a
    valve with two or more inlet ports wherein the ratio of the sum of the periphery of the inlet ports to the square root of the sum of the areas of the inlet ports is greater than four,
comprising the steps:
    selecting the fluid, and
    selecting the wetted materials, and
selecting operating values for six variables from a list comprising:
    flow, temperature, inlet pressure, outlet pressure, area enclosed by the inlet ports, periphery length of the inlet ports, and separation between the displaceable membrane and the top surface of the inlet ports at full scale flow; and
    calculating the value of the seventh variable by using a High Flow Periphery Algorithm.

* * * * *